O. SCHULZ.
TURBO-UNIPOLAR GENERATOR.
APPLICATION FILED FEB. 4, 1909.

958,681.

Patented May 17, 1910.
2 SHEETS—SHEET 1.

Fig. 1.ᵃ

Witnesses:

Inventor:

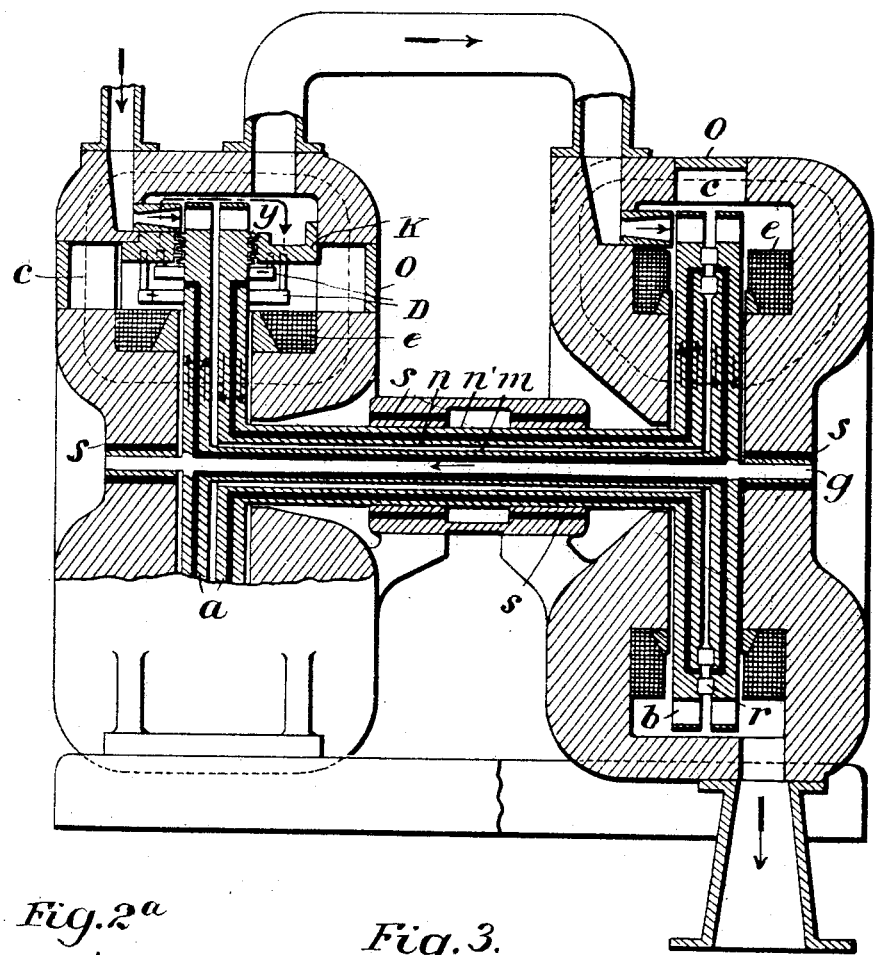

UNITED STATES PATENT OFFICE.

OTTO SCHULZ, OF SCHLACHTENSEE, NEAR BERLIN, GERMANY.

TURBO-UNIPOLAR GENERATOR.

958,681.    Specification of Letters Patent.    Patented May 17, 1910.

Application filed February 4, 1909. Serial No. 476,027.

*To all whom it may concern:*

Be it known that I, OTTO SCHULZ, a subject of the German Emperor, and residing at Schlachtensee, near Berlin, Germany, have invented certain new and useful Improvements in Turbo-Unipolar Generators, of which the following is a specification.

It is well known to those skilled in the art that if the armatures of a unipolar dynamo-electric machine rotates side by side in opposite directions, the armature reaction is canceled. It is also known that the economical speed of a pair of turbine wheels rotating in opposite directions when one is receiving motive fluid from the other is one-half that of a single wheel.

The objects of this invention therefore are to construct a turbo-unipolar generator which will combine the above features in order to obtain a machine which is efficient in operation and simple in construction.

The turbine may be simple or compound. In the compound turbo-generator a plurality of oppositely rotating rotors are mounted in each stage and the sets which rotate in the same direction are connected by shafts.

The invention will be described in connection with the accompanying drawings, in which—

Figure 1:
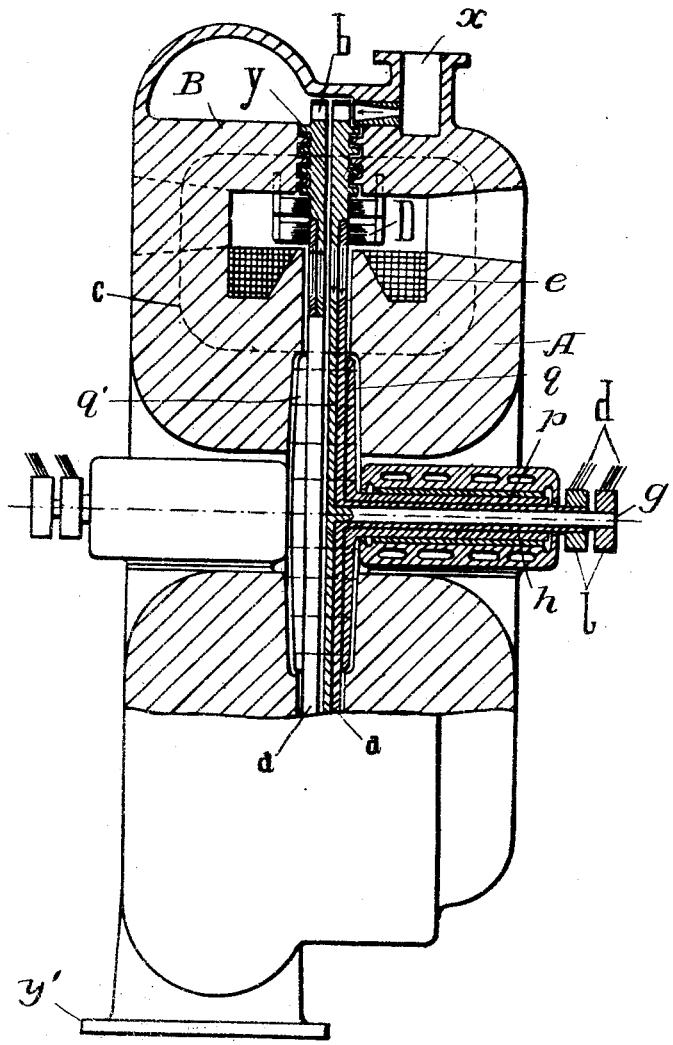
Figure 1:
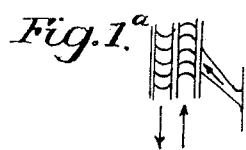

Figure 1 is a section showing one form of this invention; Fig. 1ª is a diagrammatical view; Fig. 2 is a section showing another form of this invention; Fig. 2ª is a diagram; and Figs. 3 and 4 are detail views.

Referring to the accompanying drawings, and more particularly to Fig. 1, A designates a casing which has mounted therein a pair of rotors $a$ which are secured to flange members $q$, $q'$. These flange members have formed thereon or secured thereto bearing sleeves $p$, which are mounted to rotate in bearings or pedestals secured to the casing A. The rotors have formed thereon turbine vanes, $b$, the vanes of one rotor being oppositely directed from the vanes on the other rotor. The steam is admitted at $x$ and discharged at $y'$. By means of the above construction, the rotors are driven in opposite directions, the steam exhausted from one rotor impinging upon the blades of the other rotor. This is diagrammatically shown in Fig. 1ª which also shows diagrammatically a nozzle for expanding the motive fluid. The rotors are arranged to form the armatures of a unipolar dynamo, and the casing A is preferably of magnetic material so as to form the field structure and this field is excited by a suitable winding $e$. Each armature preferably comprises a plurality of disks which are suitably insulated from each other, and are electrically connected to a sleeve $h$ and a shaft $g$, which have electrically connected thereto and mounted thereon collector rings $l$. The sleeve $h$ and shaft $g$ are of course, insulated from each other, as shown. The current is collected from the armatures by means of brushes D bearing on the armature disks directly, and by means of brushes $d$ bearing upon the collector rings. The direction of the current is shown by the arrows in Fig. 1. It will be understood that the rotors are suitably spaced and insulated from each other, and that they are also insulated from the casing A, and the bearings or pedestals. In order to protect the winding $e$ and the brushes against the steam, these parts are protected by an annular bridge B which separates the steam spaces from the brushes and winding. A suitable steam packing $y$ preferably of the labyrinth type, as shown, is provided in order to make a steam tight joint. It will be seen that the steam admitted at $x$ will drive the rotors in opposite directions, thereby causing the speed in this case to be halved, and canceling all armature reaction.

In Fig. 2 is shown a compound turbo-generator. In this case, the casings A forming separate pressure stages, are mounted on a single bed plate. The casings as in the construction shown in Fig. 1, preferably form, the field structure for the generator, the path of the flux being shown by the dotted line $c$. In this case, the high pressure turbine, shown at the left of the figure, is also provided with a bridge K which protects the brushes D and the winding $e$. The steam is admitted to the left hand casing and after it is exhausted, it is discharged into the right hand casing, and there utilized. In order to permit inspection of the parts, removable cover plates O are provided. In order to support the rotors, a central shaft $g$ is mounted for rotation in end bearings in the casings, the end bearings being insulated from the casing by suitable insulating sleeves $s$. This shaft $g$ is rigidly and electrically connected to the outside armature disks of the outside rotors. The inside armature disks of the outside rotors, are rigidly and electrically connected by means of a sleeve $m$, the armature disks of the outside rotors, the shaft $g$ and the sleeve $m$ being rigidly connected so as to rotate together. The armature disks of the inside rotors are also rigidly and electrically connected by sleeves $n$, $n'$. The outside sleeve $n'$ is mounted in a central bearing which is insulatedly mounted in a central pedestal, the insulation being indicated by $s$. It will be understood that the shaft $g$ and the sleeves $m$, $n$, $n'$, are insulated from each other as shown in the figures.

The direction of the current is shown by the arrows, and the terminals of the machine are indicated by + and —. All the armature disks, of all the rotors are electrically connected in series by means of the brushes D and the brushes $r$. The flow of the current can be readily traced by means of the arrows. By means of this construction and connection, the voltage of the machine is relatively high, while the speed of the rotors is relatively low.

While the brushes $r$ may be of various constructions, they are preferably of the construction shown in Figs. 3 and 4. These brushes $r$ are electrically conducting elastic rollers or balls located between the armatures and rolling on the sides of the same. The brushes may consist of a single hollow elastic metal ring whose normal diameter is slightly larger than the distance between the armatures $a$, so that the slightly deformed ring lies against the armatures with a surface sufficient for transmitting the current. The roller brush may however, be made elastic by placing several rings of thin sheet metal one within the other, as shown in Fig. 4. In this case, the multiple rings form an exceedingly elastic layer which can be flattened sufficient for the transmission of current, without any permanent deformation of the roller as a whole. These rollers are especially useful when used with the unipolar armatures since friction is thereby greatly reduced, and in addition these rollers form a convenient and efficient electrical connection. The armatures are preferably provided with shallow grooves $t$ in which the brushes $r$ roll.

As will be understood from the above, my turbo-unipolar generator having rotors rotating in opposite directions has the improvements aimed at, and also possesses other great advantages over the system known heretofore. In the case of the combination of a turbine and unipolar generator using a single turbine wheel, the velocity of the steam makes necessary in the interest of efficiency such a high velocity of the rotor or armature that it is practically impossible to collect the current with the means in use heretofore. A lower speed of the rotor is uneconomical and causes too low tensions which are insufficient for practical requirements, so that the machine would appear to be unpracticable. With my improved machine, however, in consequence of the rotors or armatures rotating in opposite directions, the circumferential velocity may be reduced as far as possible without any fear of tensions which are practically useless, as the reduction in speed is compensated by the greater number of rotors or armatures. On the other hand, however, somewhat high speeds may be used with the present machine, as it is possible to make use of a peculiar connection by means of the roller-brushes owing to the rotors or armatures rotating in opposite directions.

Having thus described the invention, what is claimed is:

1. In a turbo-generator, the combination with incasing means forming a plurality of communicating pressure stages, and means for magnetizing said incasing means, of a plurality of rotors revoluble in opposite directions in each pressure stage, each rotor comprising one or more armatures having blades at the periphery of the same, the blades of alternate rotors in each stage being oppositely directed, the inner rotors having central attachments rigidly connecting the same together, and the outer rotors being rigidly connected together by central attachments located within said former attachments.

2. In a dynamo electric machine, the combination with means for setting up a magnetic field, of a plurality of armatures revoluble in opposite directions, and conducting rollers between the armatures for electrically connecting them each roller having rolling contact with two armatures, said rollers comprising elastic cylinders.

3. In a turbo-generator, the combination of a casing having a chamber provided with an inlet and an outlet, a plurality of rotors revoluble in said casing and extending into said chamber, said rotors each comprising one or more armatures having oppositely directed blades at the periphery of the same, a field winding in said chamber for energizing the casing, brushes in said chamber contacting with said rotors, and a bridge in said chamber separating the part thereof containing said brushes and field winding from the part thereof containing said blades.

4. In a turbo-generator, the combination with a casing and means for magnetizing the casing, of an armature revoluble in said casing and provided with turbine vanes, means for supplying motive fluid to said vanes, collecting brushes bearing on said armature, and a bridge in said casing separating said brushes and said vanes.

5. In a turbo-generator, the combination with a casing, of a winding in said casing for magnetizing the same, an armature revoluble in said casing and provided with turbine vanes, means for supplying motive fluid to said vanes, collecting brushes bearing on said armature, and a bridge in said casing separating said winding and brushes from said vanes.

In testimony whereof, I affix my signature in the presence of two witnesses.

OTTO SCHULZ.

Witnesses:
　　WOLDEMAR HAUPT,
　　HENRY HASPER.